Jan. 17, 1956     H. W. LITTLE     2,730,921
UNDERWATER VIEWING DEVICE
Filed March 11, 1953
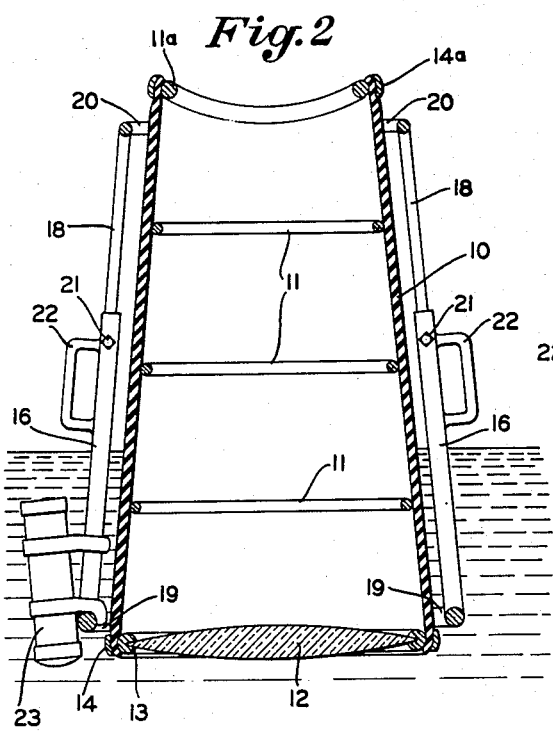
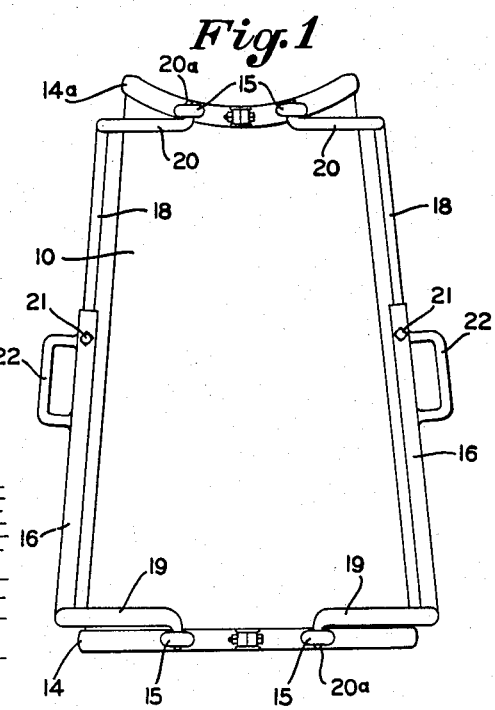
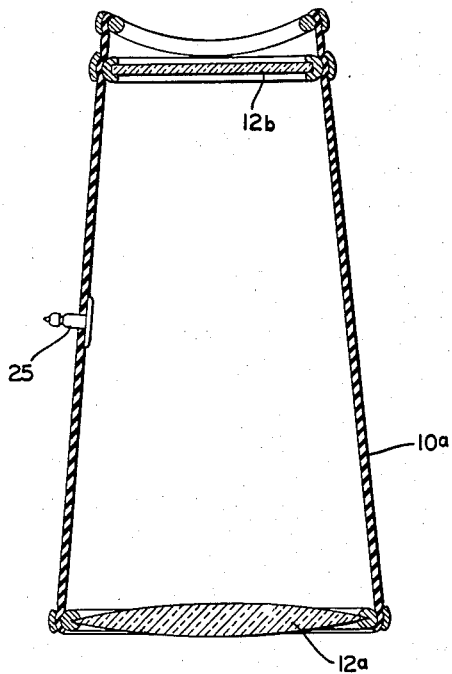
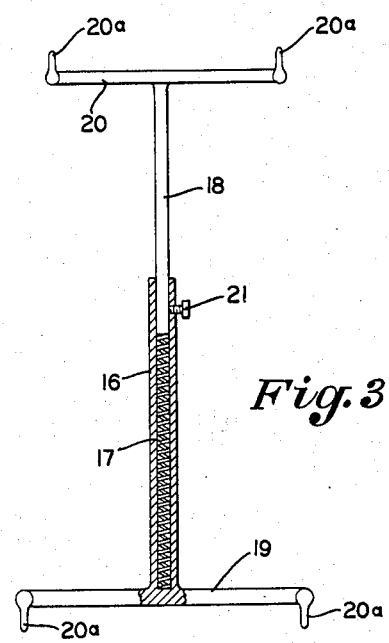
INVENTOR.
*Howard W. Little*
BY
*Frease & Bishop*
ATTORNEYS

United States Patent Office 2,730,921
Patented Jan. 17, 1956

2,730,921
UNDERWATER VIEWING DEVICE
Howard W. Little, near Canton, Ohio
Application March 11, 1953, Serial No. 341,807
3 Claims. (Cl. 88—1)

The invention relates to devices for underwater viewing and more particularly to a device of this character which may be collapsed for storage and transportation.

An object of the invention is to provide an underwater viewing device or periscope comprising a flexible tube of rubber, plastic or other suitable waterproof material, having a glass or lens in its lower end, and provided with means for holding the tube in extended or inflated condition for use.

Another object is to provide such a device in which the flexible tube is in the form of a truncated cone.

A further object is to provide an underwater viewing device of this character provided with detachable spring loaded telescoping tubes for holding the flexible tube in extended condition.

A still further object is to provide such a device in which handles are provided upon the telescoping tubes for manipulating the device.

It is also an object of the invention to provide a device of the character referred to with a light adjacent to the glass or lens for illuminating beneath the surface of the water.

Another object is to provide such a device with an infrared lamp for use at night.

It is also an object of the invention to provide an underwater viewer for use with an ultra-violet light for underwater prospecting for minerals.

A further object is to provide an underwater viewing device comprising a flexible tube having a glass or lens at each end, the device being sealed so that it is airtight, and provided with means for inflating the tube with air.

The above objects together with others which will be apparent from the drawing and following description, or which may be later referred to, may be attained by constructing the improved underwater viewing device in the manner hereinafter described in detail and illustrated in the accompanying drawing, in which:

Fig. 1 is a side elevation of an underwater viewing device embodying the invention, showing the same in extended condition;

Fig. 2 is a longitudinal section through the device in extended condition;

Fig. 3 a detached, longitudinal section through one of the spring loaded telescoping tubes for holding the tube in extended condition; and, Fig. 4 a longitudinal section of a modified form of the invention.

Referring first more particularly to the form of the invention illustrated in Figs. 1 to 3, in which similar numerals refer to similar parts throughout, the device comprises a collapsible tube 10 formed of rubber, plastic or other flexible, waterproof material, which is preferably in the form of a truncated cone.

Spaced rings 11 are attached at intervals to the inner wall of the tube 10 by any suitable means such as a waterproof cement or the like, for the purpose of extending the tube circumferentially. These rings may be of any suitable rigid material such as metal, plastic or the like.

At the lower or larger end of the tube a glass or lens 12 is attached by any well known means for providing a watertight seal, such as indicated at 13. An outer ring 14, of metal or the like is shown attached to the exterior of the tube 10, at the lower end thereof, by cement or other means.

The upper end of the tube 10 may be shaped to fit around the face of the user, and for this purpose the uppermost inner ring 11a is curved laterally as shown in Figs. 1 and 2.

An outer ring 14a, at the upper end of the tube, is shaped similar to the inner ring 11a, and attached to the exterior of the tube by any suitable means such as cement.

Both outer tubes 14 and 14a are provided with a plurality of outwardly disposed eyes or loops 15 for the purpose of detachably connecting means for extending the tube longitudinally. This means is shown as comprising spring loaded telescoping tubes, each of which comprises a tube 16 in which is located a coil spring 17 and a detachable tube or rod 18 which may be telescoped within the tube 16 to partially compress the spring 17 therein.

T-heads 19 and 20 are formed upon the outer extremities of the members 16 and 18 respectively, and provided at their ends with the outturned fingers or pins 20a adapted to engage the eyes or loops 15 on the rings 14 and 14a to hold the tube longitudinally extended as shown in Figs. 1 and 2.

For the purpose of preventing the springs 17 from being compressed by pressure of the water, a set screw 21 may be provided in each tube 16 for engagement with the inner tube or rod 18 to hold the same in adjusted position.

Handles 22 may be provided upon opposite sides of the tube 10 for permitting the same to be grasped by both hands and held with the lower portion of the device submerged as shown in Fig. 2. As shown in the drawing, these handles may be mounted upon the telescoping tubes 16.

For the purpose of illuminating objects under water, a light as indicated at 23 may be carried at the lower end of the device, either inside of the tube 10, or preferably on the exterior thereof, as shown in Fig. 2. This light is in the form of an electric flash light, provided with a watertight case. If desired a colored light may be provided, or, for use at night, an infra red light may be used. For underwater prospecting for minerals an ultra violet light may be used.

In use, the handles 22 are grasped by both hands and the lower end of the device is submerged below the surface of the water, as shown in Fig. 2. The user then positions his face in the upper, curved end of the device, so that outside light is shut off from the exterior of the tube 10, thus permitting the user to look through the glass or lens 12 at objects under water.

If desired, the lens 12 may be a magnifying glass, so as to more easily see small objects. The light 23 may be used if necessary, and this may be a colored light if desired, or for night use an infra red light may be used.

In Fig. 4 is shown a modification of the invention in which the flexible tube 10a has a glass or lens 12a sealed in its lower end, and a glass or lens 12b sealed in its upper end, so that an airtight structure is provided.

For the purpose of extending the tube 10a for use, a valve 25, such as the ordinary tire valve, is provided, whereby the tube may be inflated by means of a tire pump or the like. Handles and a light may be provided if desired.

From the above it will be apparent that the device may be knocked down or collapsed for storage and transportation and may be easily and readily extended for use.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details disclosed.

Having now described the invention or discovery, the construction, the operation, and use of preferred embodiments thereof, and the advantageous new and useful results obtained thereby; the new and useful constructions, and reasonable mechanical equivalents thereof obvious to those skilled in the art, are set forth in the appended claims.

I claim:

1. An underwater viewing device comprising a collapsible flexible tube, a glass in the lower end of the tube, means providing a watertight seal between the glass and the tube, transversely disposed rings secured to the inner walls of the tube at spaced intervals for extending the flexible tube circumferentially at spaced points throughout its length, transversely disposed rings on the exterior of the tube at opposite ends thereof, spaced eyes on the exterior rings at each end of the tube, and spring loaded telescoping members having angular fingers at opposite ends for detachable engagement with said eyes for extending the flexible tube longitudinally.

2. An underwater viewing device comprising a collapsible flexible tube, a glass in the lower end of the tube, means providing a watertight seal between the glass and the tube, transversely disposed rings secured to the inner walls of the tube at spaced intervals for extending the flexible tube circumferentially at spaced points throughout its length, transversely disposed rings on the exterior of the tube at opposite ends thereof, spaced eyes on the exterior rings at each end of the tube, a pair of rigid tubes each having a T-head at one end provided with angular fingers for detachable engagement with the eyes at one end of the flexible tube, a rod slidably mounted in each rigid tube and having a T-head at one end provided with angular fingers for detachable engagement with the eyes at the other end of the flexible tube, and coil springs within the rigid tubes for urging the rods outwardly for extending the flexible tube longitudinally.

3. An underwater viewing device comprising a collapsible flexible tube, a glass in the lower end of the tube, means providing a watertight seal between the glass and the tube, transversely disposed rings secured to the inner walls of the tube at spaced intervals for extending the flexible tube circumferentially at spaced points throughout its length, transversely disposed rings on the exterior of the tube at opposite ends thereof, spaced eyes on the exterior rings at each end of the tube, a pair of rigid tubes each having a T-head at one end provided with angular fingers for detachable engagement with the eyes at one end of the flexible tube, a rod slidably mounted in each rigid tube and having a T-head at one end provided with angular fingers for detachable engagement with the eyes at the other end of the flexible tube, and coil springs within the rigid tubes for urging the rods outwardly, and handles upon the rigid tubes for manipulating the viewing device.

References Cited in the file of this patent

UNITED STATES PATENTS

| 256,521 | Waterhouse | Apr. 18, 1882 |
| 1,451,096 | Hagen | Apr. 10, 1923 |
| 1,782,660 | Meyer | Nov. 25, 1930 |
| 1,846,798 | Dixon | Feb. 23, 1932 |
| 2,075,649 | Knight | Mar. 30, 1937 |
| 2,343,473 | Pierson | Mar. 4, 1944 |

FOREIGN PATENTS

| 63,204 | Germany | July 1, 1892 |
| 344,446 | France | Sept. 5, 1904 |